US007011259B2

(12) United States Patent
Kharina et al.

(10) Patent No.: US 7,011,259 B2
(45) Date of Patent: Mar. 14, 2006

(54) APPARATUS FOR WORKING AND PROCESSING MATERIALS

(75) Inventors: Rita Adamovna Kharina, St. Petersburg (RU); Alexandras Mikhailovich Chepulis, Kaunas (LT); Papken Arutunovich Meltonian, St. Petersburg (RU)

(73) Assignee: Microscrap, Inc., Pittsburgh, PA (US)

( * ) Notice: Subject to any disclaimer, the term of this patent is extended or adjusted under 35 U.S.C. 154(b) by 306 days.

(21) Appl. No.: 10/048,716

(22) PCT Filed: Jul. 13, 2001

(86) PCT No.: PCT/IB01/01908

§ 371 (c)(1),
(2), (4) Date: Dec. 10, 2002

(87) PCT Pub. No.: WO02/06025

PCT Pub. Date: Jan. 24, 2002

(65) Prior Publication Data

US 2003/0122005 A1    Jul. 3, 2003

(30) Foreign Application Priority Data

Jul. 13, 2000    (RU) ............................... 2000118205

(51) Int. Cl.
*B02C 23/36* (2006.01)

(52) U.S. Cl. .................. 241/46.01; 241/277; 241/293; 241/DIG. 31

(58) Field of Classification Search ........ 241/DIG. 31, 241/67, 242, 293, 277, 294, 46.01
See application file for complete search history.

(56) References Cited

U.S. PATENT DOCUMENTS 1,764,020 A * 6/1930 Hopkins ...................... 241/69
2,887,276 A * 5/1959 Minarik ...................... 241/67
4,422,581 A   12/1983 Chryst (Continued)

FOREIGN PATENT DOCUMENTS

CH   894627    4/1958
DE   1392872   5/1975

(Continued)

*Primary Examiner*—Daniel C. Crane
(74) *Attorney, Agent, or Firm*—Buchanan Ingersoll PC

(57) ABSTRACT

A system for working and processing material, for example, for disintegrating different material, especially elastomers, in different branches of industry for lowering quantity of waste. The apparatus includes a housing with: branch pipes for introducing initial material and discharging a ready product. The working tool is mounted on a shaft inside the housing. The tool is connected with a drive unit. The surface of the tool is formed by large number of cutting edges with ducts embedded into the body of the tool. Cavities of ducts are joined by means of shaped passages with a source of pressurized fluid. An angle of attack of the cutting edges is selected in the range of 85–95 degrees. The drive unit power is in the range of 100–300 kW; the revolution number of the tool is in the range of 3,000–12,000 rev/mm. The effect is an enhanced efficiency of the apparatus, increased dispersion degree and uniformity of structure of the product.

17 Claims, 3 Drawing Sheets

U.S. PATENT DOCUMENTS

| | | | |
|---|---|---|---|
| 4,989,305 A | * | 2/1991 | Pole et al. .................. 241/293 |
| 5,234,171 A | * | 8/1993 | Fantacci .................. 241/24.14 |
| 5,269,471 A | | 12/1993 | Yamagishi |
| 5,369,884 A | * | 12/1994 | Chen ....................... 29/895.32 |
| 5,375,775 A | | 12/1994 | Keller et al. |
| 5,637,434 A | | 6/1997 | Ikushima et al. |
| 6,318,651 B1 | * | 11/2001 | Spiering ...................... 241/93 |
| 6,630,277 B1 | * | 10/2003 | Naka et al. ............ 430/137.18 |

FOREIGN PATENT DOCUMENTS

DE      42 00 827 A1      7/1993

* cited by examiner

APPARATUS FOR WORKING AND PROCESSING MATERIALS

BACKGROUND OF THE INVENTION

1. Field of the Invention

The invention at hand falls into the category of tools for the working and processing of materials, including tools for the disintegration of various materials, primarily elastomers, and can be used in different branches of technology to reduce wastes.

The proposed invention is especially efficient in disposing of used automobile and aircraft tires of different brands, which is a pressing problem around the world.

2. Description of the Prior Art

A device already exists for the grinding of rubber wastes. This device contains a pressure chamber with openings for liquefaction and a piston that is positioned within the chamber so as to facilitate movement in the axial direction, within which the openings are fashioned in the lateral direction relative to the housing for the purpose of reducing power consumption during the grinding of wastes, as well as reducing the pressure needed [see Russian Federation (RF) Patent 1122211, B 29 H 19/00].

The shortcomings of this device consist of a complicated design that results in a low degree of reliability, a low level of efficiency, and a high rubber waste processing cost.

A device also already exists for the working and processing of materials that contains a housing with pipes for introducing the source materials and discharging the finished product, within which a working tool connected to a drive mechanism is mounted on a shaft. Here, the surface of the working tool is formed by a set of cutting edges [see Soviet Union (SU) Patent 1066843 A, Jan. 15, 1984].

Since it has the greatest number of similar features and since the most similar result is achieved during its use, this latter preexisting engineering solution was selected as the closest analog of the invention at hand.

The shortcomings of this analog consist of low working quality parameters, as well as a low degree of working efficiency due a low productive capacity, reliability, and useful life.

SUMMARY OF THE INVENTION

The invention at hand is based on the resolution of the problem of creating a high-productivity device for the working, primarily the disintegrating, of various materials, especially elastomers, during the operation of which the self-excited oscillations that inevitably occur in a "tool-material" system are moved to higher resonance frequencies located in the ultrasound band; that is, above 2,000 hertz (Hz).

This stated objective is achieved by virtue of the fact that the subject device for the working and processing of materials, which contains a housing with pipes for introducing the source material and discharging the finished product, within which a working tool connected to a drive mechanism is mounted on a shaft and the surface of the working tool is formed by a set of cutting edges, is distinctive in that channels cut into the working tool's housing are fashioned between the adjacent cutting edges, the cavities of which are connected to a pressurized medium source by means of shaped conduits, while the angle of incidence of the cutting edges is set within limits of 85–95°, output of the drive mechanism ranges from 100 to 300 kilowatts (kW), and the rotational speed of the tool is set within limits of 3,000–12,000 revolutions per minute (rpm). This device is also distinctive in that the working tool is fashioned in the form of a set of disks held in place by stud bolts, around the periphery of each of which cutting edges are fashioned, while recesses that form the shaped conduits for the delivery of the pressurized medium are fashioned on the lateral surfaces. The loosened particles embedded in the cutting section of the working tool are carried away by the medium, which consists of a single gas and/or a single fluid, or a combination thereof. The geometry and dimensions of the conduits along which the gas or fluid is delivered are selected based on the creation of a cavity resonator, since the self-excited oscillations within a material in the cutting edge-cutting edge region have a frequency of 3 to 10 millihertz (mHz). In this instance, the gas or combined medium takes an active part in breaking down a material, during which the medium flow is delivered at gauge pressure, while the material being worked is conveyed to and from the working tool in the reciprocating or "start-stop" mode. Here, the output of the drive mechanism is fixed at not less than 100 to 300 kW, the rotational speed of the working tool is fixed at 3,000–12,000 rpm, and the number of cutting edges is set based on the correlation $\omega \times n > 8,000$, where $\omega$ is the angular rotational speed of the tool, n is the number of cutting edges, and the angle of incidence is 85–95°.

DETAILED DESCRIPTION OF THE INVENTION

The essence of the invention for which this patent is pending is expressed in the following complement of indispensable features, which is adequate for achieving the technical result described above.

Using the subject invention, the previously specified objective is achieved by virtue of the fact that the device for working materials, which includes a moving working tool, is characterized by a working tool surface equipped with a set of cutting edges. Here, channels cut into the working tool's housing are fashioned between the adjacent cutting edges, the cavities of which are connected to the pressurized medium source by means of conduits.

This constitutes of a set of indispensable features that ensure the achievement of the desired technical result.

In addition, the solution for which this patent is pending is characterized by specific parameters for the designated technological solution and parameters for the individual subassemblies of the device:

the geometry of the cutting edges, particularly the angle of incidence, is selected based on the assurance of the existence of cumulative jets in the area where the cutting edges exert an influence on the material being worked, as well as a cumulative jet energy density that is high enough to facilitate the formation of running cracks in the body of the material being worked;

the device is equipped with a slide-valve distributor for delivering the medium flow to a confined working area (not shown in the illustration);

the working tool is fashioned in the form of a set of disks held in place by stud bolts, around the periphery of each of which cutting edges are fashioned, while recesses are fashioned on the lateral surfaces that form the shaped conduits for the delivery of the pressurized medium, and;

the shaped conduits for the delivery of the pressurized medium are fashioned with a trajectory that takes Coriolis force into account, for example, an arched trajectory.

The realization of the distinctive features of the subject invention (together with the features listed in the condensed patent claims section) culminates in the achievement of important new object properties. In the proposed engineering solution, a finely disperse finished product is efficiently generated from elastic waste materials, while the working of wood or metals results in the production of high-quality surfaces, as well as finely disperse particles that themselves constitute a raw material, for example, for use in powder metallurgy.

Figure 1:
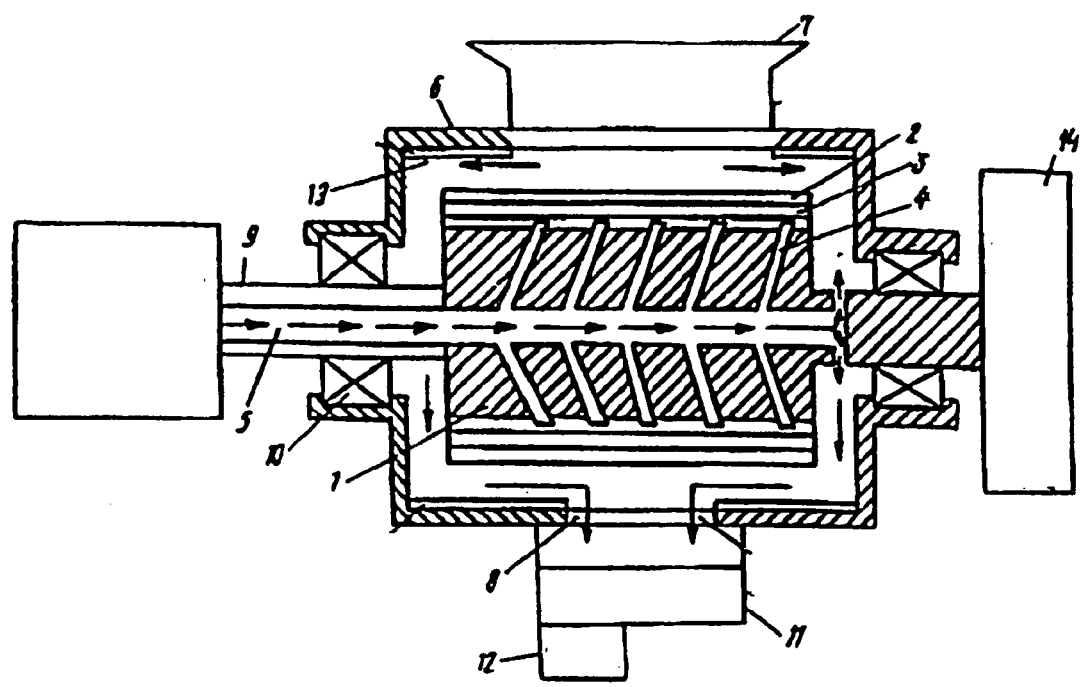
FIG. 1 is a schematic representation of the apparatus according to the present invention.
Figure 2:
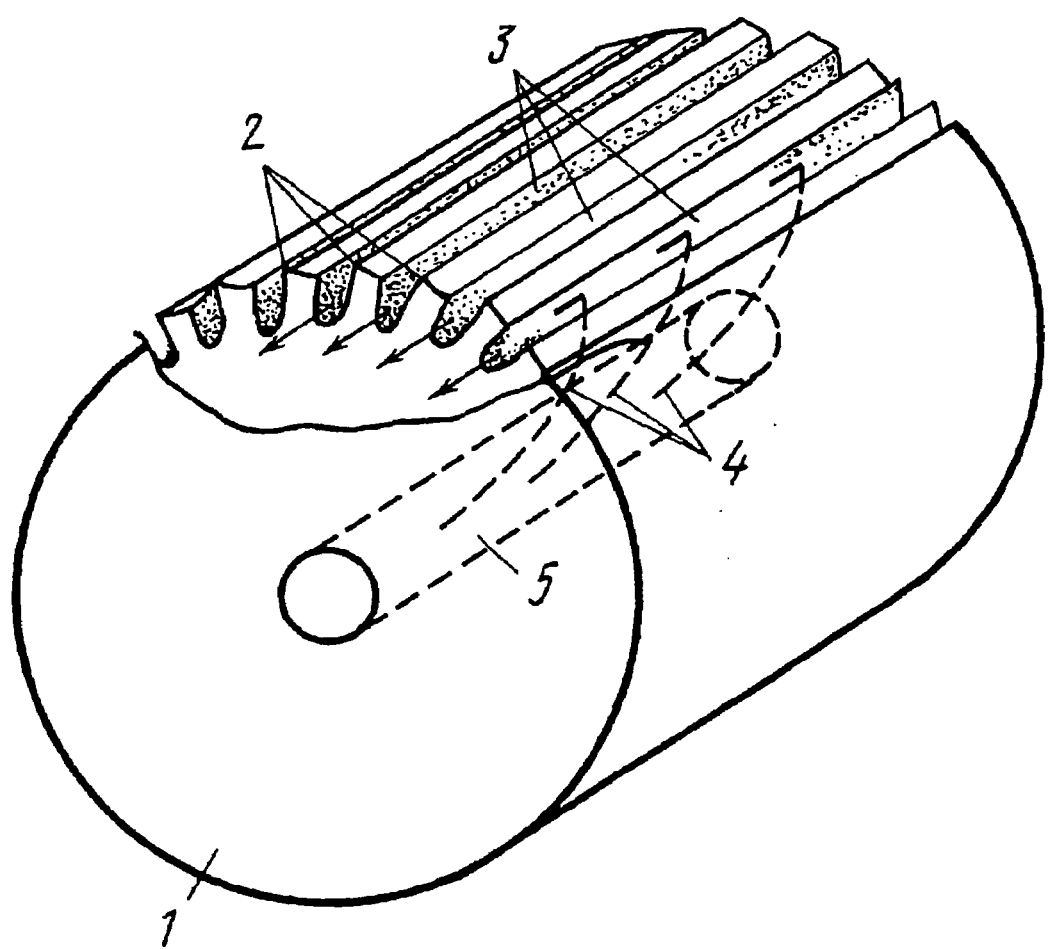
FIG. 2 is a representation view of a working tool for the present invention.
Figure 3:
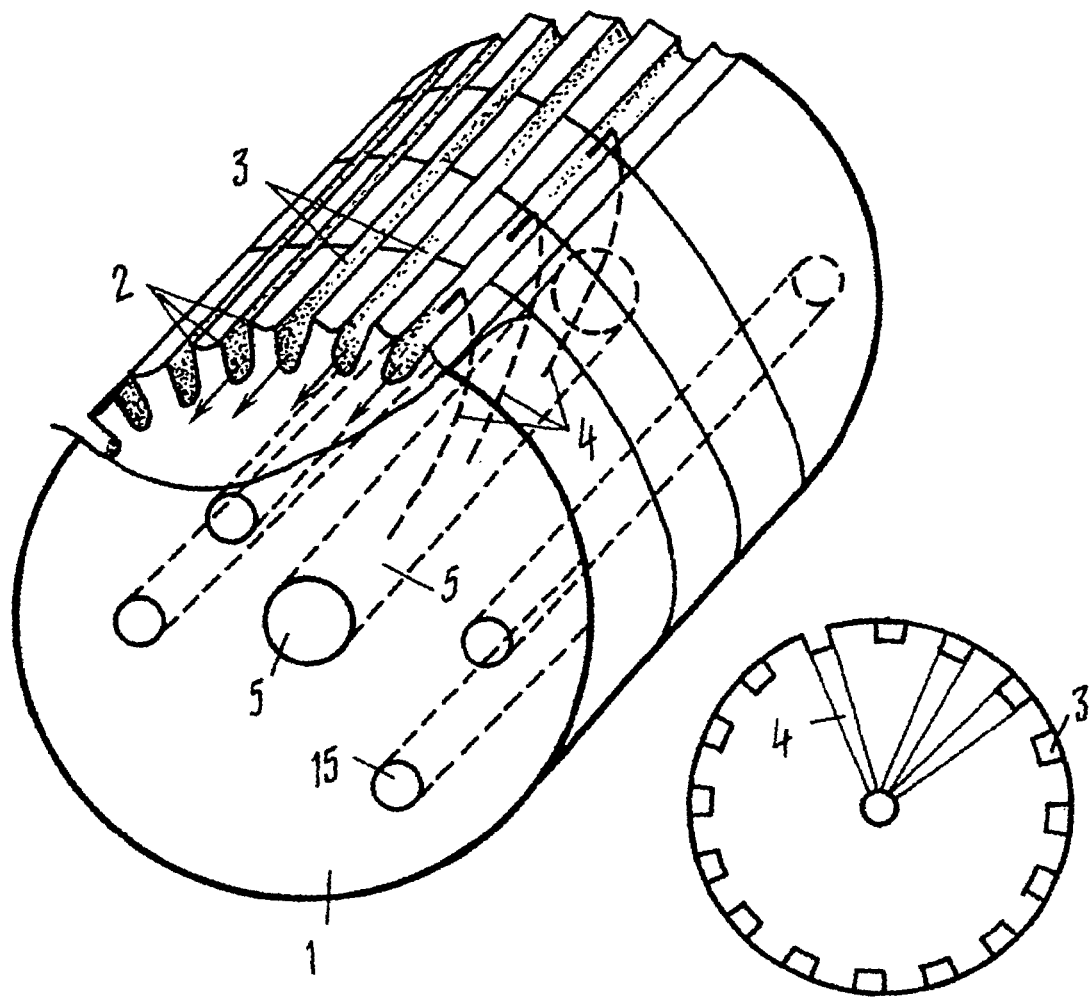
FIG. 3 is an alternate embodiment of the working tool for the present invention.

The essence of the invention at hand is elucidated by the accompanying drawings, in which an overall view of one possible version (FIG. 1) of the working tool of the device for which this patent is pending (FIG. 2) is presented. A view of a working tool in the form of a set of tightened disks is presented in FIG. 3.

The subject device contains a rotating cylindrical working tool, 1. The surface of the working tool, 1, is equipped with a sufficient number of cutting edges, 2. Channels, 3, cut into the working tool's housing are fashioned between the adjacent cutting edges. The cavities of these channels, 3, are connected to a pressurized medium source by means of shaped conducts, 4. This medium is conveyed to the device through a central header, 5. The working tool is placed inside a housing, 6, that has pipes for introducing the source material, 7, and discharging the finished product, 8. Here, the working tool is mounted on a shaft, 9. The angle of incidence of the cutting edges is set within limits of 85–95°. The output of the drive mechanism is 100–300 kW and the rotational speed of the tool is 3,000–12,000 rpm. The shaft, 9, is mounted in the housing, 6, through the use of bearings, 10. The finished product proceeds to a receiving tank, 11. A filter, 12, is installed in order to facilitate fluid drainage. For the purpose of reducing the likelihood of working tool setting, helical guides, 13, are fashioned inside the housing, 6. A high-speed electric motor with a rotational speed of 3,000–12,000 rpm, 14, serves to set the working tool into rotation.

This device is used in the following manner.

The material being worked is force-fed to one or both sides of the surface of the working tool, 1, which is rotating at the requisite speed. The speed of movement, for example, the rotation, of the working tool, 1, and its rate of advance, as well as the number of working tool cutting edges, 2, are selected based on the creation of ultrasound-frequency oscillations in the working area of the cutting tool using the correlation $\omega \cdot n > 8{,}000$, where $\omega$ is the angular rotational speed of the tool and $n$ is the number of cutting edges. The large number of cutting edges, 2, on the working tool, 1, combined with that latter's speed of rotation, increases the number of individual impacts by the working tool on the material being worked. By acting on the material being worked in the working area, the ultrasound oscillations significantly reduce power consumption for working by means of lowering the elastomer vitrification temperature, as well as by means of energy release at the boundaries and within the structural defects of the material being worked. These oscillations also take part in superimposing an energy effect on the working area.

The geometry of the cutting edges, 2, particularly the angle of incidence, is selected based on the assurance of the existence of cumulative jets in the area where the cutting edges, 2, exert an influence on the material being worked, as well as a cumulative jet energy density that is high enough to facilitate the formation of running cracks in the body of the material being worked (the angle of incidence equals 85–95°).

A set of channels, 3, for carrying away the loosened particles and releasing heat is situated between the adjacent cutting edges, 2, in the body of the working tool, 1. When the device is in operation, these channels, 3, are injected with a medium flow that consists of at least one gas, or at least one fluid, or a combination thereof, which is delivered along the conduits, 4, at several points in the channels, 3, as necessary under a pressure of several atmospheres. This pressurized medium flow through the conduits, 4, takes part in detaching particles of the material being worked by acting on the root of a chip, removes the heat released during working, and creates a pseudofluidized bed of detached particles of the material being work by removing them from the working area, thereby precluding their participation in the process of heat formation as a result of friction. The efficiency of working is also enhanced when active media are used.

Gases and/or fluids in different combinations and with different parameters are selected as the pressurized medium depending upon the nature and properties of the material being worked.

The working tool, 1, may be fashioned in the form of a set of disks held in place by threaded stud bolts, 15, around the periphery of each of which cutting edges, 2, are fashioned, while recesses are fashioned on the lateral surfaces that, which form the channels, 3, for delivering the pressurized medium that proceeds from the source through the central header, 5, to the conduits, 4.

The shaped conduits, 4, for the delivery of the pressurized medium are fashioned with a trajectory that takes Coriolis force into account, for example, an arched trajectory.

The feasibility of the commercial use of the technical solution for which this patent is pending was confirmed by the results of the successful testing of a prototype of the proposed device designed for the disintegration of used rubber tire casings. In the presence of a drive mechanism output of 300 kW, a tool rotational speed of 150–400 meters (m) per second (sec), and an impact frequency on the material being worked of 20–60 kHz when . . . [1] by a medium flow that consisted of an air-water mixture, a disintegration productivity of up to 30 tons (t) per hour was ensured. Here, the rubber crumb size was 10–100 microns ($\mu$m) and no ash fraction was present.

[1] Translator's Note: One line of text is truncated and illegible at this juncture in the copy of the source document provided for translation.

As compared to all existing tools with similar applications, the use of the solution for which this patent is pending ensures a significant increase in material working efficiency. During the working of elastomers, a high degree of finished product homogeneity and fineness is achieved. During the working of wood, a considerable increase in the speed of cutter rotation is possible without scorching the wood. Here, productive capacity is increased, the quality of the surface being worked is enhanced, and the generation of disperse particles instead of the traditional chips is ensured.

We claim:

1. A device for the working and processing of materials, which contains a housing that has pipes for introducing the source material and discharging the finished product, within which a rotary working tool connected to a drive mechanism is mounted on a shaft and the surface of the working tool is formed by a set of cutting edges, wherein channels cut into the working tool's housing are fashioned between the adjacent cutting edges, the channels being connected to a pressurized medium source by means of shaped conduits, while the angle of incidence of the cutting edges is set within limits of 85°–95°, the output of the drive mechanism is 100–300 kW, and the rotational speed of the tool is set at 3,000–12,000 rpm.

2. The device described in claim 1 wherein the working tool is fashioned in the form of a set of disks held in place by stud bolts, around the periphery of each of which cutting edges are fashioned, while recesses that form the shaped conduits for the delivery of the pressurized medium are fashioned on the lateral surfaces of the disk.

3. An apparatus for processing materials, the apparatus comprising:
   a housing having an inlet for introducing source materials to be processed and an outlet for discharging finished product;
   a working tool having a plurality of cutting edges and a plurality of channels adjacent said plurality of cutting edges, the working tool being rotatably mounted within the housing;
   means for rotating the working tool;
   means for delivering a pressurized fluid medium to said plurality of channels; and
   wherein the apparatus is operated at an oscillation frequency such that ω×n>8,000 hertz, where ω is representative of the angular rotational speed of the working tool measured in revolutions per second and n is a number representative of said plurality of cutting blades.

4. The apparatus as recited in claim 3, where the angular rotational speed of the working tool is in a range of about 3,000 rpm to about 12,000 rpm.

5. The apparatus as recited in claim 3, wherein each of said plurality of cutting edges has an angle of incidence of about 85°–95°.

6. The apparatus as recited in claim 3, wherein said means for delivering a pressurized fluid medium to said plurality of channels comprises:
   a pressurized medium source disposed adjacent the housing;
   a header disposed within the working tool and in fluid communication with the pressurized medium source;
   and a plurality of conduits in fluid communication between said plurality of channels and the header.

7. The apparatus as recited in claim 3, wherein the working tool is further comprised of a plurality of disks secured together by bolts.

8. The apparatus as recited in claim 3, wherein said means for rotating the working tool comprises a drive mechanism having an output of about 100–300 kw.

9. The apparatus as recited in claim 4, wherein each of said plurality of cutting edges has an angle of incidence of about 85°–95°.

10. The apparatus as recited in claim 5, wherein said means for delivering a pressurized fluid medium to said plurality of channels comprises:
    a pressurized medium source disposed adjacent the housing;
    a header disposed within the working tool and in fluid communication with the pressurized medium source;
    and a plurality of conduits in fluid communication between said plurality of channels and the header.

11. The apparatus as recited in claim 6, wherein the working tool is further comprised of a plurality of disks secured together by bolts.

12. The apparatus as recited in claim 7, wherein the working tool is further comprised of a plurality of disks secured together by bolts.

13. The apparatus as recited in claim 12, wherein the pressurized medium is an air-water mixture.

14. The apparatus as recited in claim 6, wherein said plurality of conduits have an arched trajectory.

15. The apparatus as recited in claim 3, wherein the source material is an elastomer such that the finished product has a crumb size of about 10–100 microns.

16. The apparatus as recited in claim 3, wherein the source material comprises tires and the angular rotational speed of the working tool is in a range of about 3,000 rpm–12,000 rpm, and each of said plurality of cutting edges has an angle of incidence of about 85°–95° such that the finished product has a crumb size of about 10–100 microns.

17. An apparatus for grinding vehicle tires, the apparatus comprising:
    a housing having an inlet for introducing the vehicle tires therein and an outlet for discharging ground tire material;
    a cylindrical working tool having a plurality of cutting edges each having an angle of incidence of about 85°–95° on an outer surface thereof and a plurality of channels between said cutting edges, the cylindrical working tool being rotatably mounted with in the housing, and the working tool having a header in fluid communication with each of said plurality of channels;
    means for rotating the cylindrical working tool in a range about 3,000–12,000 rpm;
    a pressurized fluid source in fluid communication with the header such that pressurized fluid is introduced into said plurality of channels; and
    wherein the ground tire material has a crumb size of about 10–100 microns.

* * * * *